May 27, 1941.  R. S. WALSH  2,243,236

TABLEWARE

Filed June 12, 1939

INVENTOR
ROBERT S. WALSH
BY
ATTORNEY

Patented May 27, 1941

2,243,236

UNITED STATES PATENT OFFICE 2,243,236

TABLEWARE

Robert S. Walsh, St. Louis, Mo.

Application June 12, 1939, Serial No. 278,637

2 Claims. (Cl. 294—1)

This invention relates to a certain new and useful improvement in table ware and has for its primary object the provision, as a new article of manufacture, of a simple, cheap, auxiliary implement of table ware conveniently usable for facilitating the eating of various foods.

And with the above and other objects in view, my invention resides in the novel features of form, construction, arrangement, and combination of parts presently described and pointed out in the claims.

In the accompanying drawing—

Figure 3:
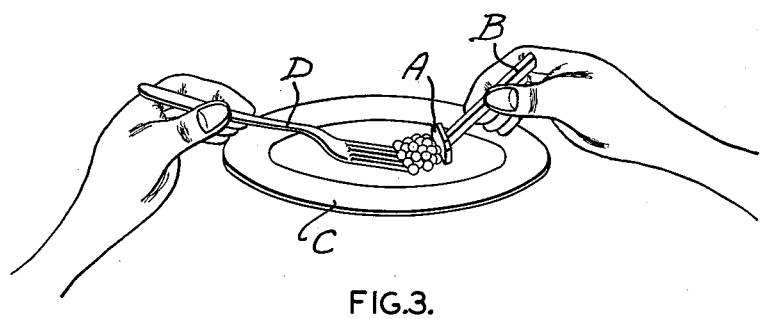
Figure 3 is a perspective view illustrating the auxiliary association of the implement with a fork as in the act of eating.
Figure 1:
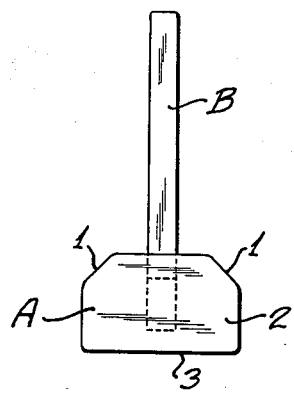
Figure 1 is a front elevational view of a tableware implement embodying my invention.

Referring now in more detail and by reference characters to the drawing, which illustrates a preferred embodiment of my invention, my new implement of tableware comprises a head A which is constructed of any suitable durable material conformable preferably to that of which table knives, forks, and the like are constructed, and which is of general oblong-rectangular contour or configuration, as shown, with its upper corners, as at 1, preferably cut-away for attractiveness, the head A having a front flat pushing face 2 and a lower or bottom scraping face 3 disposed at right angles to the pushing face 2.

Figure 2:
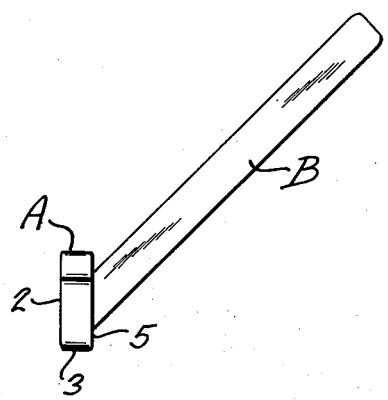
Figure 2 is a side elevational view of the implement.

Suitably permanently fixed to and upon, and extending obliquely upwardly and rearwardly from, the rear face 5 of the head A, is a suitably elongated handle B preferably, though not necessarily, constructed of the same material as that of the head A and preferably having a rectangular cross-section, all as best seen in Figure 2, it being understood, of course, that the implement is of a size for convenient gripping and manipulation by the fingers, as shown in Figure 3.

Accordingly, in use and practice, the implement may be held in one hand with the scraper-face 3 flatwise upon a plate, dish, or the like C, as shown in Figure 3. A fork D may be held in the other hand, and the gathering of the particular foodstuff upon the fork D for conveyance to the mouth may be facilitated in a simple, convenient, and highly genteel manner, as illustrated in Figure 3, thereby conducing to the ease and satisfaction of the diner and obviating the frequency occurring embarrassment of "chasing food around the plate."

The implement is simple in form, may be cheaply manufactured, is durable in structure, and may be repeatedly sterilized or cleaned for repeated use. It may be added that the article is also particularly useful in assisting children in learning proper eating habits and table manners, and in obviating the using of the fingers or a crust of bread or the like in retaining food upon a plate or in pushing food upon a spoon or fork, thereby reducing the soiling of table linens and conducing to general table neatness and cleanliness.

It should be understood that changes and modifications in the form, construction, arrangement, and combination of parts of the eating implement may be made and substituted for those herein shown and described without departing from the nature and principle of my invention.

Having thus described my invention, what I claim and desire to secure by Letters Patent is:

1. As a new article of manufacture, an implement of tableware comprising a handle and a head mounted on an end, and extending symmetrically on either side, of the handle, the head being disposed in a plane oblique to the longitudinal axis of the handle and having a forwardly presented flat pusher face and transversely extending scraper face disposed at right angles to the pusher face.

2. As a new article of manufacture, an implement of tableware comprising a handle and a head-member mounted on an end, and extending symmetrically on either side, of the handle, the head being disposed in a plane oblique to the longitudinal axis of the handle, and having a forwardly presented flat pusher face and a transversely extending substantially wide bottom face disposed at right angles to the pusher face for preventing rocking movement of the head when the latter is being pushed across the surface of a plate.

ROBERT S. WALSH.